United States Patent [19]
Menzilcioglu et al.

[11] Patent Number: 5,825,765
[45] Date of Patent: Oct. 20, 1998

[54] COMMUNICATION NETWORK BASED ON ATM FOR GENERAL PURPOSE COMPUTERS

[75] Inventors: Onat Menzilcioglu; Eric C. Cooper; Robert D. Sansom; Francois J. Bitz, all of Pittsburgh, Pa.

[73] Assignee: FORE Systems, Inc., Warrendale, Pa.

[21] Appl. No.: 861,272

[22] Filed: Mar. 31, 1992

[51] Int. Cl.$^6$ ................................................ H04J 3/24
[52] U.S. Cl. ........................... 370/394; 370/389; 370/395
[58] Field of Search ........................... 370/60, 60.1, 94.1, 370/82, 83, 91, 85.15, 352, 422, 384, 394, 470, 472, 405, 395, 396, 389

[56] References Cited

U.S. PATENT DOCUMENTS

| | | | |
|---|---|---|---|
| Re. 33,900 | 4/1992 | Howson | 370/13 |
| 4,353,128 | 10/1982 | Cummiskey | 370/91 |
| 4,831,647 | 5/1989 | D'Avello et al. | 379/144 |
| 5,130,984 | 7/1992 | Cisneros | 370/85.2 |
| 5,136,584 | 8/1992 | Hedlund | 370/94.1 |
| 5,166,926 | 11/1992 | Cisneros et al. | 370/94.1 |
| 5,228,028 | 7/1993 | Cucchi et al. | 370/94.1 |
| 5,229,992 | 7/1993 | Jurkevich et al. | 370/60 |
| 5,241,534 | 8/1993 | Omuro et al. | 340/827 |
| 5,568,478 | 10/1996 | van Loo, Jr. et al. | 370/395 |
| 5,600,652 | 2/1997 | Kreamer et al. | 370/396 |

*Primary Examiner*—Douglas W. Olms
*Assistant Examiner*—Shick Hom
*Attorney, Agent, or Firm*—Ansel M. Schwartz

[57] ABSTRACT

The present inventions pertains to a communication network. The communication network comprises an ATM network. The communication network also comprises at least two general purpose computers. Each computer has a processor, a memory in communication with the processor, and an input/output bus in communication with the processor, memory and the ATM network. The N computers communicate with each other through the ATM network and operate instructions for applications other than communications between the other computers.

33 Claims, 10 Drawing Sheets

| WORD | | | | |
|---|---|---|---|---|
| 0 | BYTE0 | BYTE1 | BYTE2 | BYTE3 |
| 1 | BYTE4 | PAD 1 | BYTE5 | BYTE6 |
| 2 | BYTE7 | BYTE8 | BYTE9 | BYTE10 |
| 3 | BYTE11 | BYTE12 | BYTE13 | BYTE14 |
| 4 | BYTE15 | BYTE16 | BYTE17 | BYTE18 |
| 5 | BYTE19 | BYTE20 | BYTE21 | BYTE22 |
| 6 | BYTE23 | BYTE24 | BYTE25 | BYTE26 |
| 7 | BYTE27 | BYTE28 | BYTE29 | BYTE30 |
| 8 | BYTE31 | BYTE32 | BYTE33 | BYTE34 |
| 9 | BYTE35 | BYTE36 | BYTE37 | BYTE38 |
| 10 | BYTE39 | BYTE40 | BYTE41 | BYTE42 |
| 11 | BYTE43 | BYTE44 | BYTE45 | BYTE46 |
| 12 | BYTE47 | BYTE48 | BYTE49 | BYTE50 |
| 13 | BYTE51 | BYTE52 | PAD 2 | |

*FIG.6*

*FIG.12*
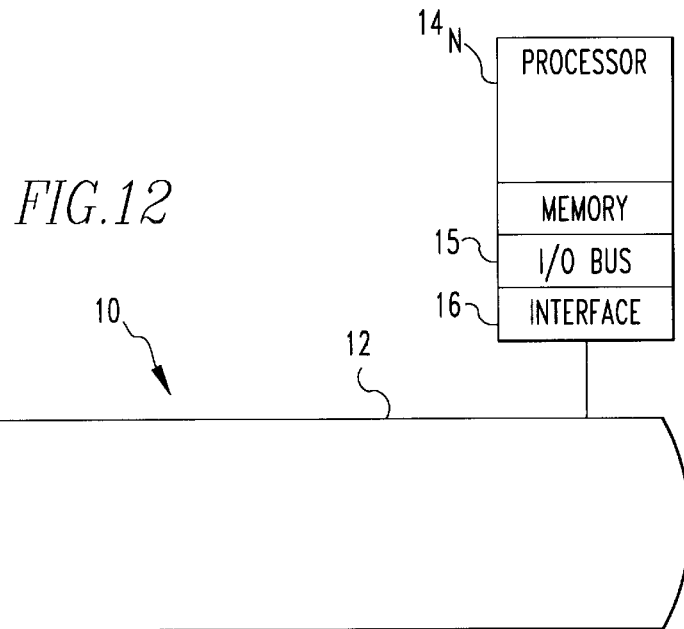
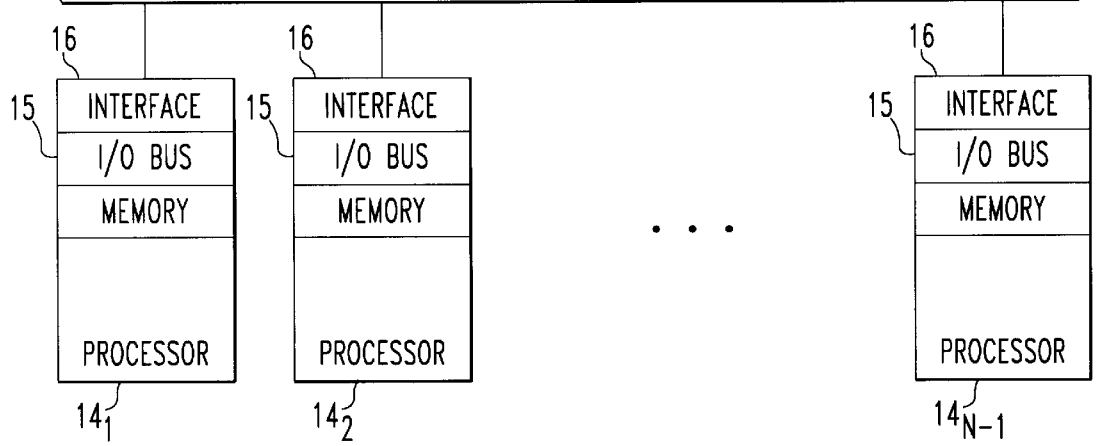
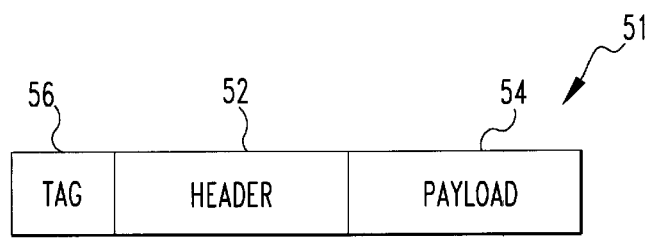
*FIG.13*

COMMUNICATION NETWORK BASED ON ATM FOR GENERAL PURPOSE COMPUTERS

This invention was made under Naval Research Laboratory Contract N00014-90-C-2220.

FIELD OF THE INVENTION

The present invention pertains to communication networks. More specifically, the present invention pertains to communications between general purpose computers over an ATM network through an interface.

BACKGROUND OF THE INVENTION

The telecommunications industry has developed a new international standard called Asynchronous Transfer Mode (ATM) that will be the basis of the forthcoming Broadband Integrated Services Digital Network (BISDN). The ATM standard allows transmission of intermixed audio, video, and data over high-speed links. As well as being used in wide-area networks, the ATM standard can be used for local-area networks to support multimedia applications.

The unit of transmission used in the ATM standard is a cell. An ATM cell contains fifty-three bytes of information and has the basic format shown in FIG. 1. The four-byte header field contains virtual path and virtual channel identifiers which are used for routing the cell through the ATM network. The HEC byte contains a CRC (cyclic redundancy check) value to check the correctness of the cell header and to allow correction of single-bit errors if desired.

The payload section of the ATM cell contains forty-eight bytes of data. These forty-eight bytes can be utilized or formatted in different ways depending on which type of information a cell carries. Currently, there are multiple proposed standards, called ATM Adaptation Layer protocols, specifying the format of the payload field. For example, the VBR (variable bit rate) AAL specifies a Segmentation and Reassembly (SAR) protocol that is designed to carry traditional data communication. In this SAR protocol, the payload field is formatted as shown in FIG. 2.

The first two bytes of the payload field are the SAR header and contain a sequence number and message identification field to prevent loss and reordering of cells within a data packet. The last two bytes are the SAR trailer and include a CRC computed over the rest of the payload.

Other AAL protocols, for example to carry audio and video information, have not been finalized yet, but in the current draft standards the cell payload is formatted differently from the VBR AAL SAR format described above. However, the same basic format, of a small number of bytes of control information together with the payload data, is used for all of the proposed standards.

Since the ATM standard was designed primarily for telecommunication networks, interfacing computers directly to networks using the ATM standard poses efficiency problems. These problems are due to the format of the ATM cell which is ill-suited for processing by general-purpose computers. These problems arise whenever computers need to send or receive ATM or cell-based data not only in local area computer networks but also in long-distance telecommunication networks.

This efficiency problem exists because most modern computers use a four-byte (thirty-two bit) word (sixty-four or higher is also available) as the basic unit of data and of input and output. Although, access to bytes and halfwords (two bytes) are possible, the I/O buses and memories used in many computers, including most workstations, are thirty-two bit wide and optimized for this size access. Since an ATM cell is fifty-three bytes long, it is not conveniently aligned along thirty-two bit word boundaries and causes problems when reading or writing a cell over a thirty-two bit wide I/O bus.

For example, suppose the computer tries to read the payload of an ATM cell that contains twelve words (forty-eight bytes total) of information over a thirty-two bit I/O bus. Since this information begins at the sixth byte of the ATM cell (after the five-byte ATM cell header), the computer must either read the ATM cell one byte at a time and construct the thirty-two bit data words in its memory, or read the whole cell as thirteen four-byte words and shift their contents as many bytes as needed to obtain the word-aligned version of the cell's payload. Similarly, when processing AAL protocols which further delineate the cell payload, the computer must extract subfields which are typically not word-aligned and thus leave behind non-word-aligned data.

Besides the alignment problem, the efficiency of a computer is also effected by having to process cells which are erroneous. They can be erroneous because the information they contain is incorrect due to, for instance, a problem with transmission which causes a portion of the cell to be truncated or a byte to be changed. When an erroneous cell is part of a sequence of cells, the efficiency of the computer is reduced because all subsequent related cells must be processed in full and then discarded. If there could be some way for the computer to discard these related cells without processing them in full, the efficiency of the computer can be improved.

The present invention solves these efficiency problems and facilitates the processing of ATM cells by computers. In a preferred embodiment, the invention is part of an ATM computer interface which is a card or board that connects a computer to an ATM-based network.

SUMMARY OF THE INVENTION

The present inventions pertains to a communication network. The communication network comprises an ATM network. The communication network also comprises at least two general purpose computers. Each computer has a processor, a memory in communication with the processor, and an input/output bus in communication with the processor, memory and the ATM network. The computers communicate with each other through the ATM network and execute instructions for applications other than communications between the other computers.

Additionally, the present invention pertains to an interface. The interface is disposed between and in communication with the ATM network and each input/output bus of the N computers. Preferably, the interface is comprised of a receive engine which receives a cell from the ATM network, determines the cell's integrity, places a tag with the cell corresponding to the cell's integrity, and reorganizes the cell so the cell can be understood by the respective computer. The receive engine is in communication with the input/output bus and the ATM network. The interface is also comprised of a transmit engine which transmits a cell from the respective computer to the ATM network and reorganizes the cell from the respective computer so the cell from the respective computer can be effectively transmitted on the ATM network. The transmit engine is in communication with the input/output bus and the ATM network.

Additionally, the present invention pertains to the receive engine. The receive engine is comprised of a receive cell formatter having means to read CRCs of the cell and place the tag with the cell corresponding to the integrity of the cell as indicated by its CRCs.

The present invention furthermore pertains to a cell for transmission on an ATM network. The cell comprises a header portion. The cell is also comprised of a payload portion in connection with the header portion. Moreover, the cell is comprised of a tag portion in conjunction with the payload and header portions. The tag portion has information concerning the integrity of the cell. The tag, header and payload portions are formed of at least fifty-six bytes.

Moreover, the present invention pertains to a system for communication. The system for communication comprises an ATM layer in which cells in a first representation travel. The system also comprises an adaptation layer in communication with the ATM layer in which cells are converted from the first representation into a second representation. There is also a user layer in communication with the adaptation layer, with the adaption layer between the user layer and the ATM layer. The cells in the second representation travel in the user layer.

BRIEF DESCRIPTION OF THE DRAWINGS

In the accompanying drawings, the preferred embodiment of the invention and preferred methods of practicing the invention are illustrated in which:

FIG. 6 is a schematic representation of a cell format.

FIG. 12 is a schematic representation of a communication network.

FIG. 13 is a schematic representation of a cell.

DESCRIPTION OF THE PREFERRED EMBODIMENT

Figure 1:
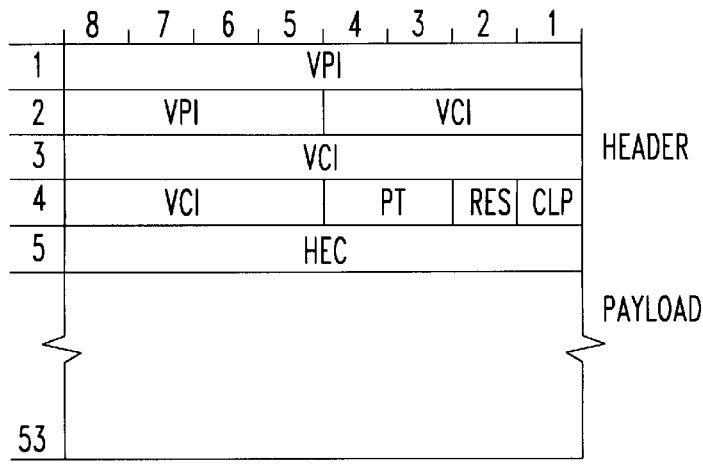
FIG. 1 is a schematic representation of an ATM cell format.
Figure 2:
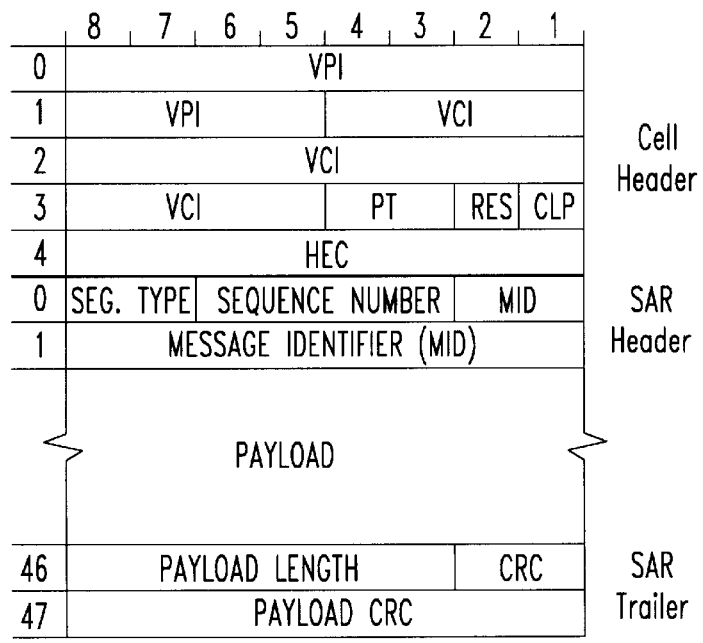
FIG. 2 is a schematic representation of an ATM cell and SAR format.

Referring now to the drawings wherein like reference numerals refer to similar or identical parts throughout the several views, and more specifically to FIG. 12 thereof, there is shown a communication network 10. The communication network 10 is comprised of an ATM network 12. The communication network 10 is also comprised of at least two general purpose computers 14. A general purpose computer is a device that can be used in conjunction with software written by its users or by third party developers to perform tasks whose nature is determined by the users, not the manufacturer or vendor of the computer. Each computer 14 has a processor, a memory in communication with the processor and an input/output bus is in communication with the processor, memory and the ATM network 12. The computers 14 communicate with each other through the ATM network 12 and operate instructions for applications other than communications between the other computers 14.

Figure 11:
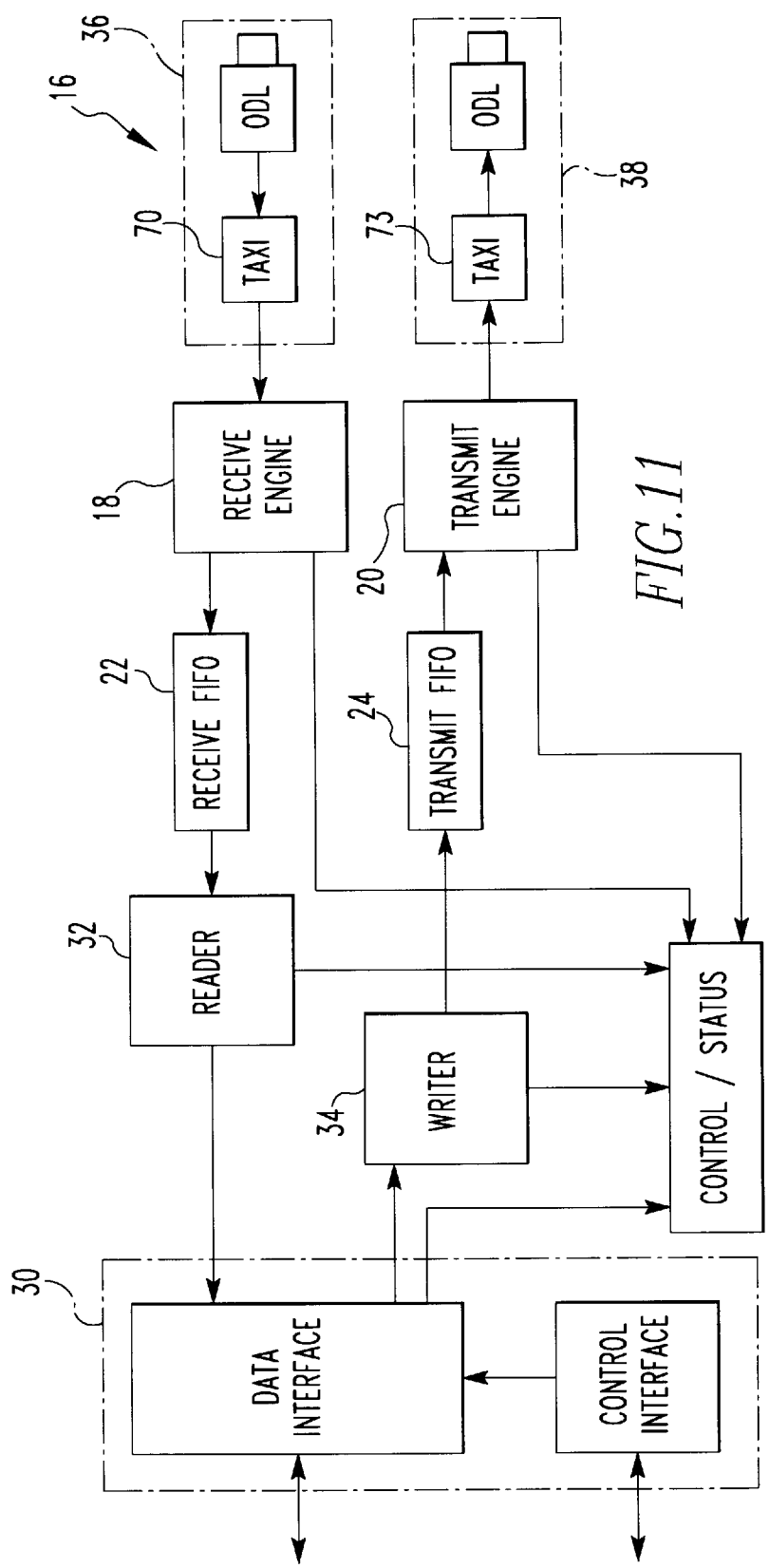
FIG. 11 is a schematic representation of an interface.

Preferably, there is an interface 16 disposed between and in communication with the ATM network 12 and each input/output bus of each computer 14. The term input/output bus is used to describe any means of connecting a processor (or microprocessor or CPU) to the other elements that make up a general purpose computer (such as input/output devices or computer memory). As shown in FIG. 11, interface 16 is preferably comprised of a receive engine 18 which receives a cell from the ATM network 12, determines the cell's integrity, places a tag with the cell corresponding to the cell's integrity and reorganizes the cell so the cell can be understood by the respective computer 14. The receive engine 18 is in communication with the input/output bus 15 and the ATM network 12. The interface 16 is also comprised of a transmit engine 20 which transmits a cell from the respective computer 14 to the ATM network 12 and reorganizes the cell from the respective computer 14 so the cell from the respective computer can be effectively transmitted on the ATM network 12. The transmit engine 20 is in communication with the input/output bus 15 and the ATM network 12.

The interface 16 can also include a flexible receive queue 22 in which cells from the receive engine 18 are stored to be provided to the respective computer 14 in a desired alignment. The receive queue 22 is in communication with the input/output bus 15 and the receive engine 18. The interface 16 also includes a flexible transmit queue 24 in which cells from the respective computer 14 and stored until they are to be provided the transmit engine 20 in a desired alignment. The transmit queue 24 is in communication with the input/output bus 15 and the transmit engine 20.

Figure 7:
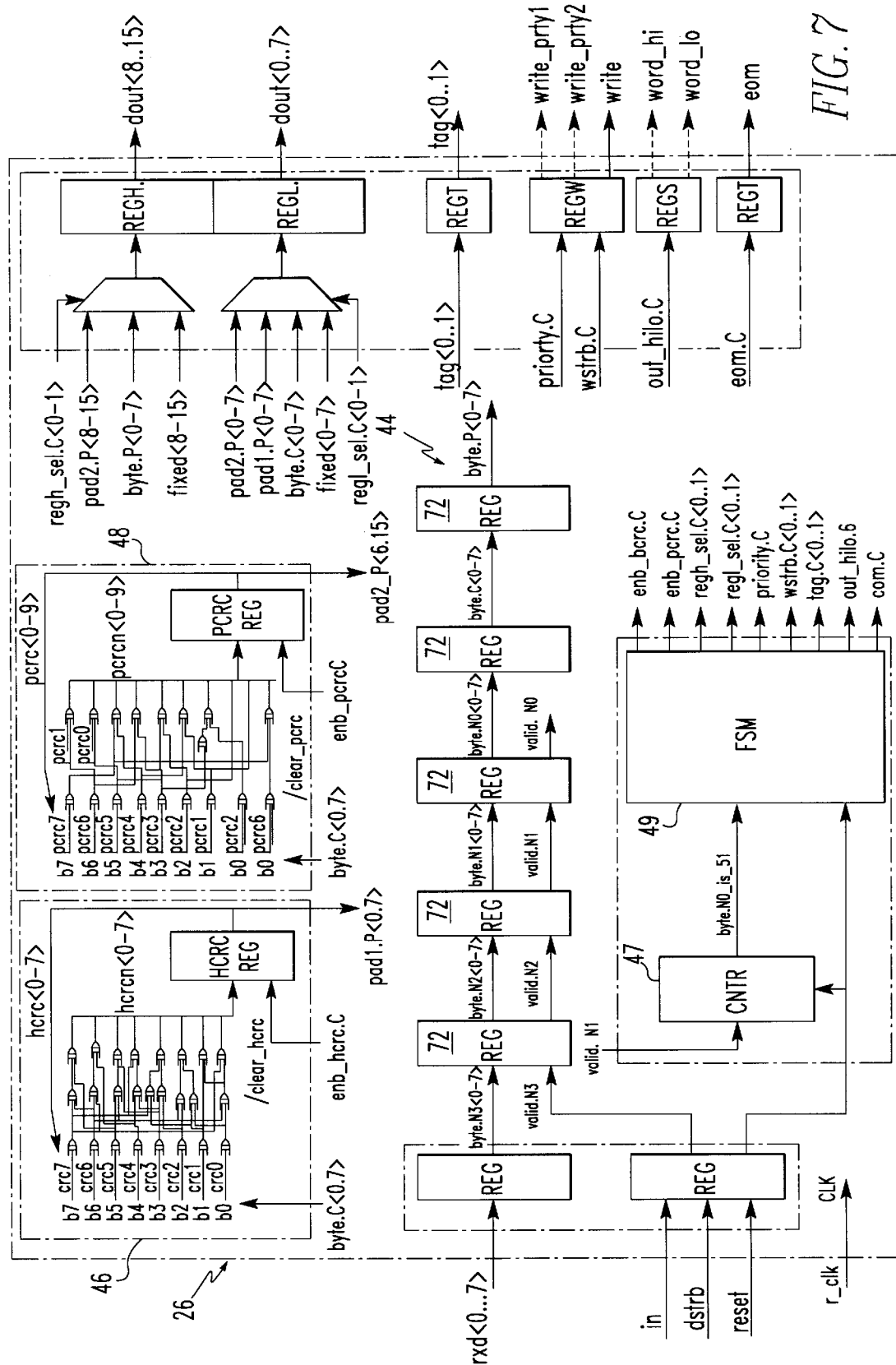
FIG. 7 is a schematic representation of a receive engine chip.

Preferably, the receive engine 18 includes a receive cell formatter 26 having means to check CRCs of the cell and place the tag with the cell corresponding to the integrity of the cell as indicated by its CRCs. The receive cell formatter 26, shown in FIG. 7, is in communication with the ATM network 12 and the flexible receive queue 22.

The transmit engine 20 preferably includes a transmit cell formatter 28 having means for calculating CRCs for a cell from the respective computer 14 and placing the CRCs in the cell that is to be transmitted to the ATM network 12. The calculating and placing means is in communication with the flexible transmit queue 24 and the ATM network 12.

The interface 16 preferably also includes an input/output bus 30 interface through which cells are provided to and received from the respective computer 14. The input/output bus interface 30 is in communication with the respective computer's input/output bus 15 and with the flexible receive queue 22 and the flexible transmit queue 24.

The interface 16 can also include a reader 32 for presenting the properly aligned cell for the respective computer 14, or for flushing the cell based preferably on the cell's tag. Cell flushing refers to the operation of discarding some or all of the data contained in an ATM cell. Although cell flushing can be performed in software (simply by reading a cell normally and then not using its data), it is possible to support cell flushing more efficiently in hardware. The reader 32 is in communication with the flexible transmit queue. There can also be a writer 34 for presenting a properly aligned cell to the ATM network 12 from the respective computer 14 to the flexible transmit queue 24. The writer 34 is in communication with the flexible transmit queue and the interface input/output bus 15. The interface 16 preferably includes a network receiver 36 in communication with the ATM network 12 and the receive cell formatter 26 through which cells from the ATM network 12 pass to the receive cell formatter 26. There is also a network transmitter 38 in communication with the ATM network 12 and the transmit cell formatter 28 through which cells pass from the transmit cell formatter 28 onto the ATM network 12. The network receiver 36 and the network transmitter 38 together comprise the network interface 37.

The receive cell formatter 26 preferably includes an input and an output in communication with the network receiver 36 and the flexible receive queue 22, respectively, in order to receive cells from the ATM network 12 and transfer cells to the receive queue 22, respectively. Additionally, there is a datapipe 44 which delays bytes of a cell received through the input so a header CRC can be computed before the cell is outputted through the output. Receive cell formatter 26 also includes a header CRC check unit 46 which computes a CRC syndrome of a cell header using a predetermined polynomial. The payload CRC check unit 48 computes a CRC syndrome of a cell payload using a predetermined polynomial. There is a counter 47 which counts bytes forming a cell. The counter 47 is used in computing the header and payload syndromes and reorganization of the cell. Additionally, there is a control finite state machine 49 which controls the operation of the receive cell formatter 26.

As shown in FIG. 13, the cell 51 for transmission on an ATM network 12 comprises a header portion 52. There is a payload portion 54 in conjunction with the header portion 52. Additionally, there is a tag portion 56 in conjunction with the payload and header portions. The tag portion 56 has information concerning the integrity of the cell 51. The tag, header and payload portions are formed of at least fifty-six bytes. The tag, header and payload portions are arranged such that they are in alignment for the receiving processor. Alternatively, the cell 51 can have fifty-two+(4)x bytes, where x is a positive integer greater than or equal to one.

Preferably, the header portion 52 has five bytes. The payload portion 54 has forty-eight bytes and the tag portion has three bytes. Preferably, the cell is organized such that the five bytes of the header portion 52 are in consecutive order, one byte of the tag portion is disposed after the header portion, the forty-eight bytes of the payload portion 54 are in consecutive order after the one byte of the tag portion 52, and bytes two and three of the tag portion 56 are disposed in consecutive order after the forty-eight bytes of the payload portion.

The one byte of the tag portion 56 contains CRC syndrome information about the header portion and bytes two and three of the tag portion 56 contain framing information about the cell and CRC syndrome information about the payload portion.

Figure 14:
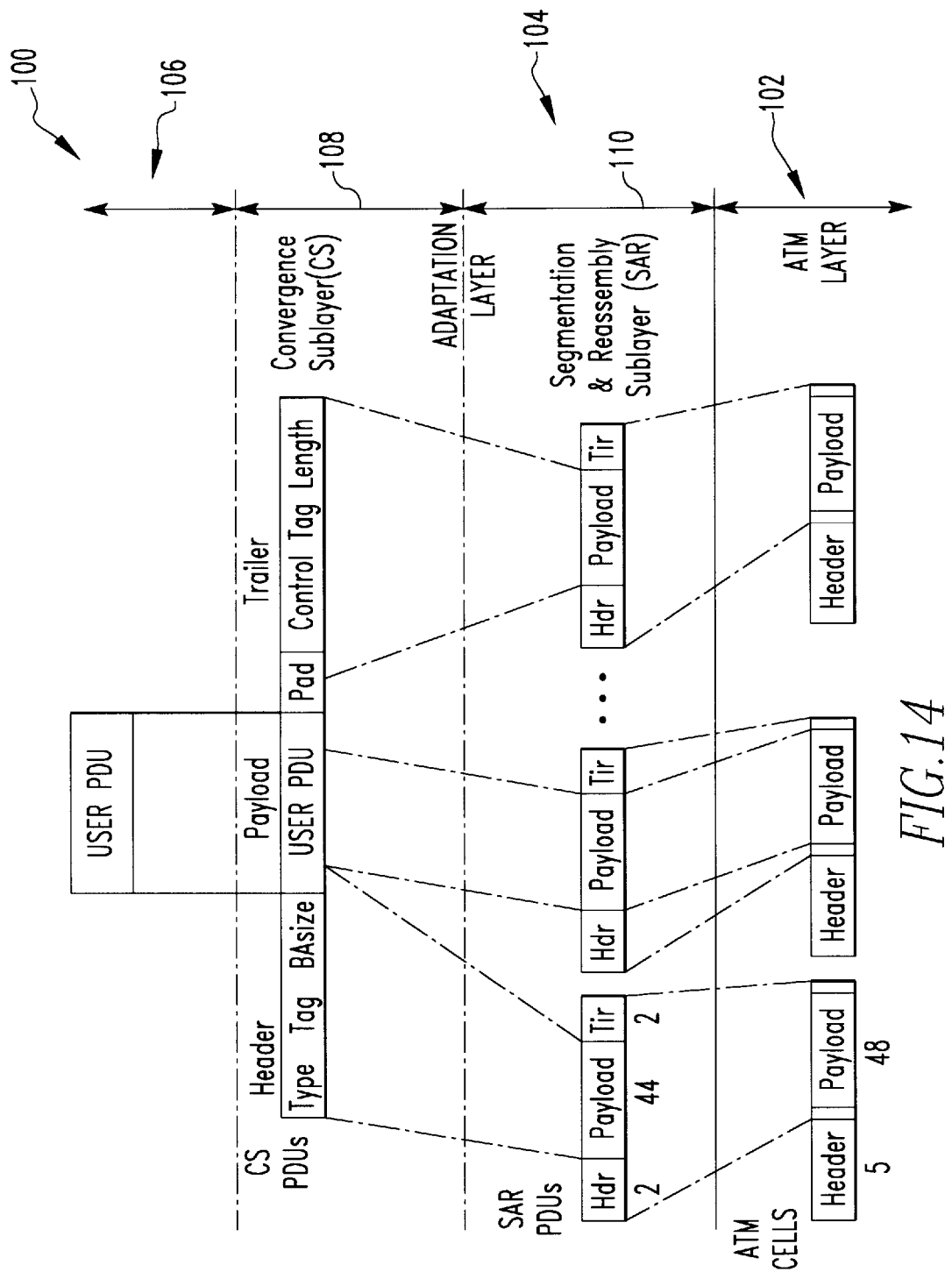
FIG. 14 is a schematic representation of the user layer, adaptation layer and ATM layer in their relationship.

The present invention also pertains to a system 100 for communication as shown in FIG. 14. The system 100 comprises an ATM layer 102 in which cells in a first organization travel. The system 100 is also comprised of an adaptation layer 104 in communication with the ATM layer in which cells are converted from the first organization into a second organization. The system 100 is also comprised of a user layer 106 in communication with the adaptation layer 104, with the adaptation layer 104 between the user layer 106 and the ATM layer 102. The cells in the second organization travel in the user layer. Preferably, the adaptation layer is comprised of a convergence sublayer 108 in communication with the user layer 106 and a segmentation and reassembly sublayer 110 in communication with the ATM layer 102 and the convergence sublayer 108.

Figure 3:
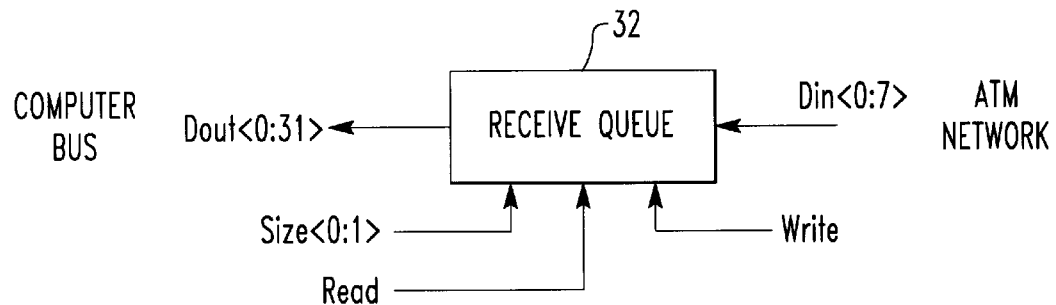
FIG. 3 is a schematic representation of a flexible receive queue.

In the operation of the invention, a flexible-width queue 32, such as FIFO, alleviates the word alignment problems of processing ATM cells. This queue 32, shown in FIG. 3, can be implemented in the interface 16 that is used to connect the computer 14 to the ATM network 12.

Cells 51 received from the network 12 are stored in the receive queue 32 one byte at a time. The output side of the queue is thirty-two bits wide, and the computer 14 can read from the queue 32 one, two, three or four consecutive bytes in parallel. The number of bytes to read are indicated by the two-bit size input. Using a combination of these access commands for reading or writing a cell 51, the host computer 14 can extract any field of an ATM cell 51 at a word-aligned boundary. It can quickly word-align a cell 51 on any byte boundary. Once the desired word alignment is reached, the computer can read four-byte words for efficient reading and processing of the ATM cell 51.

For example, when reading the cell payload 54, the computer 14 would first read a four-byte word containing the cell header 52, followed by a single-byte word containing the HEC byte. At this time, the first byte of the cell payload 54 will be at the head of the queue 32. Thereafter, the computer 14 can read the remaining forty-eight bytes of the payload using four-byte words at a time without any need to do byte-shifting or other alignments under program control.

A similar queue 24, a FIFO, is used on the transmit path. The computer 14 can write to the transmit queue 24 one to four bytes in parallel, thereby easily constructing an ATM cell 51 in the transmit FIFO. The cell 51 is read from the transmit FIFO 51 and transmitted over the network one byte at a time.

Figure 4:
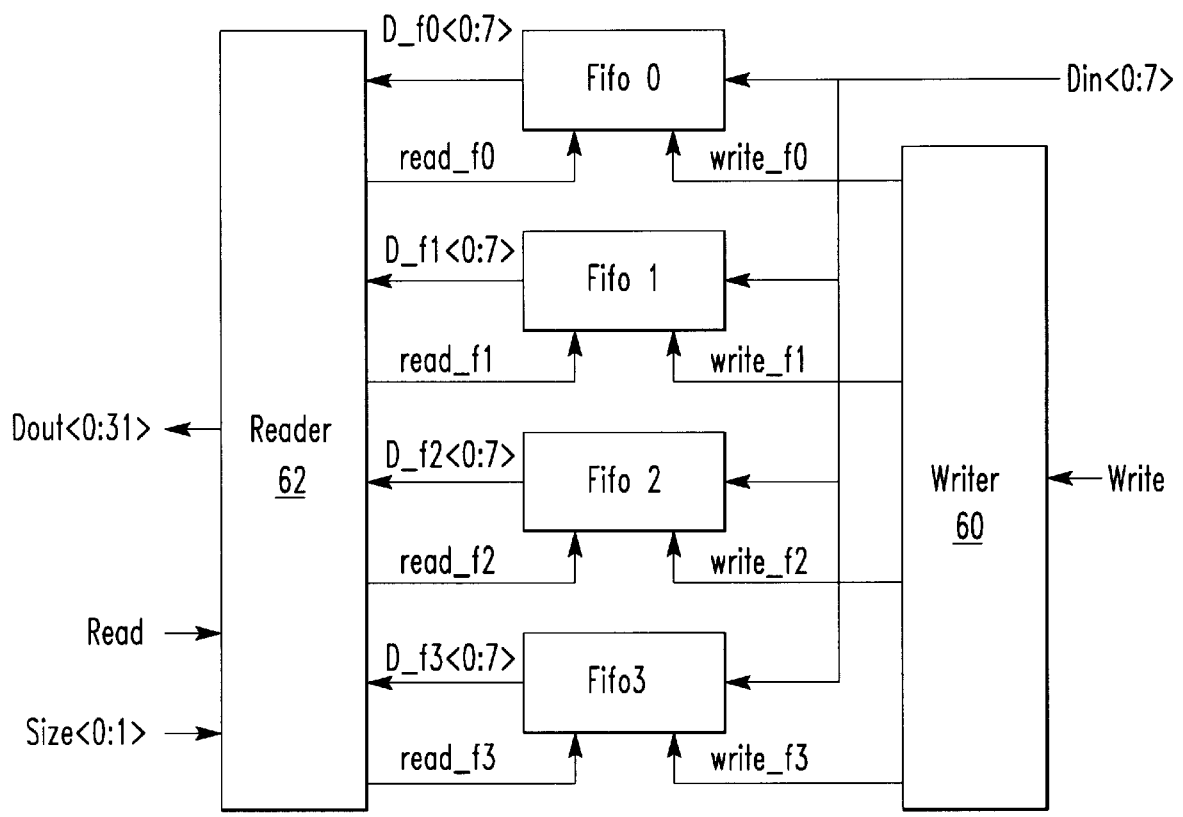
FIG. 4 is a schematic representation of the implementation with respect to a flexible receive queue.

FIG. 4 shows a hardware implementation of this flexible-width receive queue 32 for the receive path. A significant assumption behind this particular implementation is that the I/O bus interface 30 needs to be faster than the network interface 37; that is, the computer 14 must be able to read cells from the queue faster than they arrive from the network 12.

Four FIFO chips (byte wide) are used to construct a thirty-two bit wide FIFO. The ATM cells 51 received from the network 12 may come as eight-bit, sixteen-bit or thirty-two bit wide stream depending on, for instance, the fiber optic receiver used. In this description, it is assumed the cells 51 arrive as a byte stream and are written to the FIFO chips in a round-robin fashion (fifo0→fifo1→fifo2→fifo3→fifo0 . . . ). The FIFO writer block generates the write strobe for each FIFO in turn. This simple demultiplexor block 60 can be implemented by a state-machine with a two-bit counter to identify which FIFO chip is to be written next.

The FIFO reader block 62 takes as inputs the read and size signals from the computer interface. It generates a separate read strobe for each FIFO chip in round-robin fashion (fifo0→fifo1→fifo2→fifo3→fifo0 . . . ). Depending on how many bytes are to be read, a byte is read from one, two, three or all four of the FIFOs at a time by asserting one or more read strobes in parallel. The bytes read from the FIFOs are then placed in the appropriate byte position in the Dout lines and delivered to the computer bus 15. The bytes are positioned starting with the least significant byte of Dout. If the number of bytes read is one, the byte is placed in Dout<0:7>, if two, they are placed on Dout<0:15>, and so forth.

Figure 5:
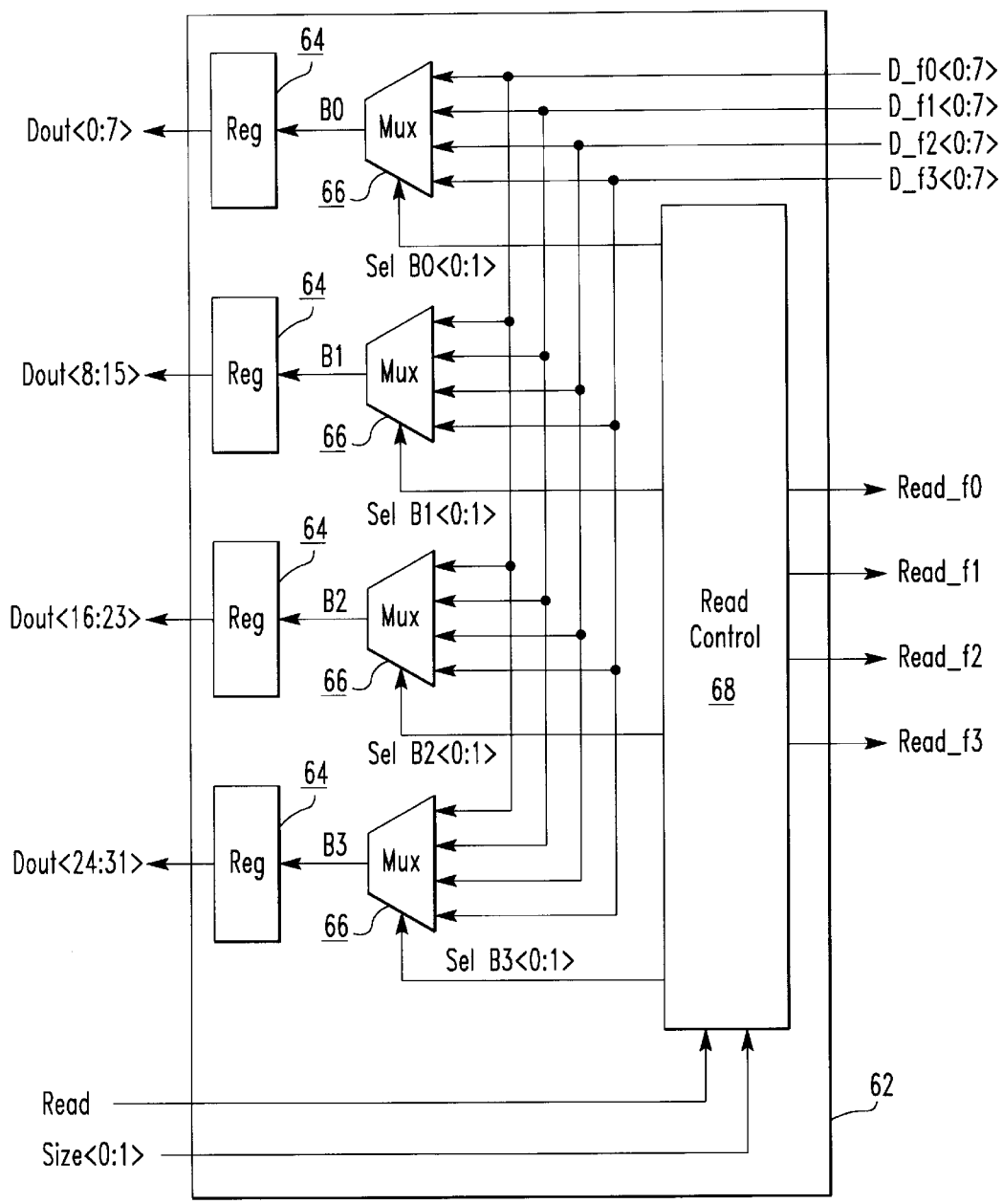
FIG. 5 is a schematic representation of an implementation of a flexible receive queue reader block.

FIG. 5 shows the internal structure of the FIFO reader block. The block consists of four byte-wide registers 64 each with a four input multiplexor 66. The inputs of the multiplexor 66 are connected to the four bytes coming from the FIFO chips. Each multiplexor 66 has a separate two-bit select input (sel_B0 for Mux0, and so on). These select signals are generated by the control unit 68. Based on the read and siz<0:1> inputs from the computer 14, the control unit 68 generates the appropriate read strobes for the FIFOs to read the requested number of bytes in parallel. The control unit uses a two-bit counter to indicate which FIFO to read next. It also generates the multiplexor select signals to set up each multiplexor 66 so that the incoming bytes are placed in the appropriate output register.

The algorithm implemented by the control unit is as follows:

```
if (size == 1){                 /* read 1 byte */
    if (fifo_pointer == 0) {
        assert(read_f0);
        B0 = D_f0;
    }
    if (fifo_pointer == 1) {
        assert(read_f1);
        B0 = D_f1;
    }
    if (fifo_pointer == 2) {
        assert(read_f2);
        B0 = D_f2;
    }
    if (fifo_pointer == 3) {
        assert(read_f3);
        B0 = D_f3;
    }
    fifo_pointer = fifo_pointer + 1;
}                               /* increment fifo_pointer by 1 mod 4*/
if (size == 2) {                /* read 2 bytes */
    if (fifo_pointer == 0) {
        assert(read_f0);
        assert(read_f1);
        B0 = D_f0;
        B0 = D_f1;
    }
    if (fifo_pointer == 1) {
        assert(read_f1);
        assert(read_f2);
        B0 = D_f1;
        B0 = D_f2;
    }
    if (fifo_pointer == 2) {
        assert(read_f2);
        assert(read_f3);
        B0 = D_f2;
        B0 = D_f3;
    }
    if (fifo_pointer == 3) {
        assert(read_f3);
        assert(read_f0);
        B0 = D_f3;
        B0 = D_f0;
    }
    fifo_pointer = fifo_pointer + 2;
}                               /* increment fifo_pointer by 2 mod 4 */
if (size == 3) {                /* read 3 bytes */
    if (fifo_pointer == 0) {
        assert(read_f0);
        assert(read_f1);
        assert(read_f2);
        B0 = D_f0;
        B0 = D_f1;
        B0 = D_f2;
    }
    if (fifo_pointer == 1) {
        assert(read_f1);
        assert(read_f2);
        assert(read_f3);
        B0 = D_f1;
        B0 = D_f2;
        B0 = D_f3;
    }
    if (fifo_pointer == 2) {
        assert(read_f2);
        assert(read_f3);
        assert(read_f0);
        B0 = D_f2;
        B0 = D_f3;
        B0 = D_f0;
    }
    if (fifo_pointer == 3) {
        assert(read_f3);
        assert(read_f0);
        assert(read_f1);
        B0 = D_f3;
        B0 = D_f0;
        B0 = D_f1;
    }
    fifo_pointer = fifo_pointer + 3;
}                               /* increment fifo_pointer by 3 mod 4 */
if (size == 4) {                /* read 4 bytes */
    assert(read_f0);
    assert(read_f1);
    assert(read_f2);
    assert(read_f3);
    B0 = D_f0;                  /* set sel_B0 so that B0 <-D_f0 */
    B1 = D_f1;                  /* set sel_B1 so that B1 <-D_f1 */
    B2 = D_f2;                  /* set sel_B2 so that B2 <-D_f2 */
    B3 = D_f3;                  /* set sel_B3 so that B3 <-D_f3 */
    fifo_pointer = fifo_pointer +4;
                                /* fifo pointer increment modulo 4 */
                                /* i.e. remains the same */
```

Additionally, ATM cells 51 contain CRCs for both the cell header 52 and the cell payload 54. These CRCs must be computed before the cell 51 is transmitted and verified when the cell 51 is received. Because computing these CRCs is expensive to do in software, it must be done in the interface 16 hardware.

Each cell 51 transmitted should have header 52 and payload CRCs 54 computed in hardware. However, sometimes, especially for testing and debugging purposes, the computer 14 will want to compute the CRCs in software instead of having them computed in hardware. Thus, it needs to inform the interface 16 not to compute the checksum.

Similarly, for each cell 51 received, its CRCs should be computed by the interface 16 hardware. The computer 14 must be informed whether the CRCs were correct. In addition, the computer 14 may want to see the computed CRC syndromes to perform error correction for single-bit errors.

Also, cells 51 received may be of the wrong size because of transmission errors. The computer 14 must be informed that a cell 51 was truncated in transmission.

To enable the above information about CRCs to be transmitted between the computer 14 and the interface 16, the ATM cells as processed by the computer 14 are expanded from the cells 51 sent over the network 12. The original fifty-three byte ATM cell 51 format is expanded into a new format that preserves the original contents but provides space for the additional information needed to specify the correctness of the cell, hold the CRC syndromes, and specify whether CRCs should be calculated in hardware. This format is shown in FIG. 6.

In the extended format an extra three bytes of information are added to the fifty-three byte ATM cell. One byte, referred to as PAD1, is inserted after the fifth (HEC) byte. Another two bytes, referred to as PAD2, are appended after the last (fifty-third) byte of the original cell. A fundamental objective for this design is to be non-destructive so that all the bytes of a raw cell can be accessed unchanged if wanted by the computer 14. This is why the cell is extended by adding the pad bytes.

The PAD1 byte is used as follows:

For incoming cells, the PAD1 byte contains the computed header CRC syndrome—the result of the CRC computation to check the correctness of the cell header 52. This byte will be zero if the header 52 was correct, and will be nonzero if the header 52 is incorrect. If it is nonzero, the syndrome can be used by the host computer 14 to correct any single bit error in the header 52 without having to recompute the CRC of the header 52.

On transmission, bit 0 of PAD1 indicates whether the interface 16 should compute the header CRC and place it in the fifth byte of the cell header 52. If this bit is zero, the computed CRC will be used, otherwise, the fifth byte will be transmitted directly.

Bit 1 is likewise used to specify whether the VBR AAL payload CRC should be computed and placed in the last ten bits of the payload. If it is zero, the computed CRC will be used, otherwise the ten bits supplied by the host computer will be transmitted directly.

Bits 2 through 7 can be used to specify similar control options for other AAL protocols as they become standardized.

The PAD2 byte is used as follows:

The lowest bit, bit 0, of PAD2 is the framing error bit. This bit is zero if the cell was properly framed, and one if there is a framing error. A framing error indicates that the cell received from the network 12 was of incorrect size.

Bit 1 is used to encode whether the header CRC check is correct. This check bit will be 0 if the header CRC is correct and 1 otherwise.

Bit 2 is used to encode whether the payload CRC (for VBR AAL protocol) check is correct. This check bit will be 0 if the header CRC is correct and 1 otherwise.

Bits three to five can be used to encode information for other AAL protocols. For example, they can be used to encode the results of other CRC type checksums when other AAL protocols are standardized.

The upper ten bits of the PAD2 field contain the computed CRC syndrome for the payload. The syndrome will be zero if the payload is correct, and nonzero otherwise; and can be used by the host for single-bit error correction of the ATM cell payload if wanted.

Thus, for incoming cells 51, the host computer 14 only needs to check whether the last three bits of the PAD2 field are all zero to verify the integrity of the cell. It is not necessary to check the header and payload CRC syndromes in PAD1 and PAD2 fields, unless desired for error correction or debugging.

FIG. 7 shows a hardware design to implement the ATM cell formatter for the receive path, called receive cell formatter 26. The receive cell formatter 26 converts a fifty-three byte raw ATM cell to the fifty-six byte ATM cell 51 in the expanded format described above. It is assumed that the ATM cells arrive from the interface 16 as a contiguous byte stream—fifty-three consecutive bytes form an ATM cell. The functional blocks used in the receive cell formatter 26 and its operation are now described.

I/O Interfaces The input and output sections interface to the network receiver chip (for example, an AMD TAXI chip 70 of FIG. 11) and to the receive queue 22. They include simple logic and registers to synchronize the input and output signals. The input data is eight bits wide, whereas the output data is sixteen bits wide.

This expansion of data width allows insertion of the extra PAD bytes used in the expanded cell format without causing a delay in the processing of the input byte stream. The multiplexors before the output data registers are used to insert the PAD1 or PAD2 bytes (depending on the cycle) and to combine successive bytes from the input stream into sixteen bit words.

Datapipe 44 The datapipe section consists of a sequence of five eight-bit wide pipeline registers 72. This pipeline delays the input byte stream so that the header CRC can be computed in parallel before a cell is output.

Header CRC 46 The header CRC check unit computes the CRC syndrome of the cell header (the first five bytes) using the polynomial:

$$x^8+x^2+x+1$$

Figure 8:
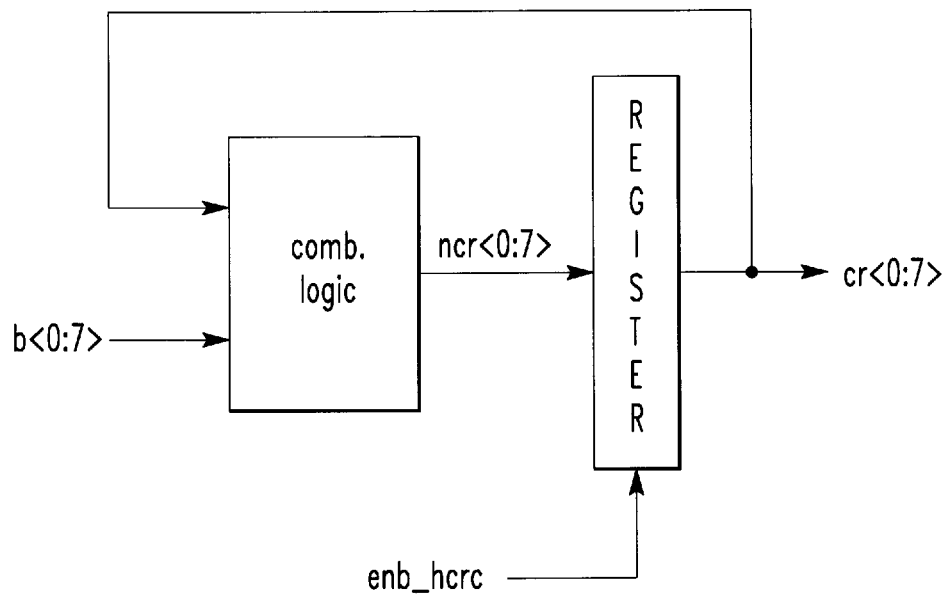
FIG. 8 is a schematic representation of a header CRC computation block.

FIG. 8 shows the circuitry used to compute the eight-bit CRC syndrome in a byte-parallel way. b<0:7> is the input byte from the byte stream, cr<0:7> is the CRC syndrome computed after the previous byte, and ncr<0:7> is the value of the CRC syndrome computed after the current byte. The signal enb_hcrc is used to enable the CRC computation—if this signal is not asserted the register containing cr<0:7> is cleared, otherwise the register is loaded with ncr<0:7> at each clock cycle. The equations for obtaining ncr<0:7> from cr<0:7> and b<0:7> are as follows ($\hat{}$ stands for the exclusive-or operator):

$$ncr0 = b0 \wedge cr0 \wedge b6 \wedge cr6 \wedge b7 \wedge cr7$$

$$ncr1 = b0 \wedge cr0 \wedge b6 \wedge cr6 \wedge b1 \wedge cr1$$

$$ncr2 = b0 \wedge cr0 \wedge b1 \wedge cr1 \wedge b6 \wedge cr6 \wedge b2 \wedge cr2$$

$$ncr3 = b1 \wedge cr1 \wedge cr7 \wedge b7 \wedge b2 \wedge cr2 \wedge b3 \wedge cr3$$

$$ncr4 = b2 \wedge cr2 \wedge b3 \wedge cr3 \wedge b4 \wedge cr4$$

$$ncr5 = b3 \wedge cr3 \wedge b4 \wedge cr4 \wedge b5 \wedge cr5$$

$$ncr6 = b4 \wedge cr4 \wedge b5 \wedge cr5 \wedge b6 \wedge cr6$$

$$ncr7 = b5 \wedge cr5 \wedge b6 \wedge cr6 \wedge b7 \wedge cr7$$

Payload CRC 48 The payload CRC check unit computes the ten-bit CRC syndrome of the cell payload 54 (the forty-eight bytes after the cell header) using the polynomial:

$$x^{10}+x^9+x^5+x^4+x+1$$

Figure 9:
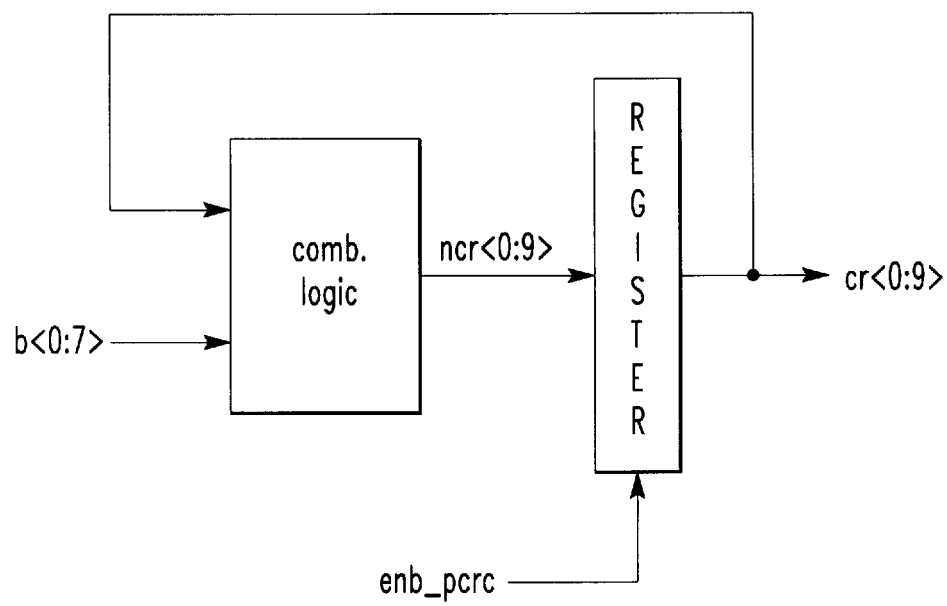
FIG. 9 is a schematic representation of a payload CRC computation block.

The computation is implemented by circuitry similar to the one used for header CRC 46 as shown in FIG. 9. The combinatorial logic equations used to compute ncr<0:9> are as follows:

$$ncr0 = b7 \wedge cr2 \wedge b6 \wedge cr3 \wedge b5 \wedge cr4 \wedge b4 \wedge cr5 \wedge b3 \wedge cr6$$

$$ncr1 = b2 \wedge cr7 \wedge b7 \wedge cr2$$

$$ncr2 = b1 \wedge cr8 \wedge b6 \wedge cr3$$

$$ncr3 = b0 \wedge cr9 \wedge b5 \wedge cr4$$

$$ncr4 = b7 \wedge cr2 \wedge b6 \wedge cr3 \wedge b5 \wedge cr4 \wedge b3 \wedge cr6$$

$$ncr5 = b3 \wedge cr6 \wedge b2 \wedge cr7 \wedge b7 \wedge cr2$$

-continued $ncr6 = b2 \wedge cr7 \wedge b1 \wedge cr8 \wedge b6 \wedge cr3$ $ncr7 = b0 \wedge cr9 \wedge b5 \wedge cr4 \wedge b1 \wedge cr8$ $ncr8 = cr0 \wedge b0 \wedge cr9 \wedge b4 \wedge cr5$ $ncr9 = cr1 \wedge b7 \wedge cr2 \wedge b6 \wedge cr3 \wedge b5 \wedge cr4 \wedge b4 \wedge cr5$ Counter A six-bit counter is used to count the bytes forming a cell. Computation of the header and payload CRC syndromes and insertion of the PAD1 and PAD2 fields are triggered by this byte count. The counter is initialized during a reset as well as after the end of a cell (indicated by a delimiter byte).

Control FSM 49 A finite state machine (FSM) is used to control the operation of the cell formatter and generate various internal control signals based on the byte count. The algorithm implemented by the FSM 49 is as follows:

```
if (reset) {
    initialize FSM;
    goto idle state;
}
idle state:
if (start_of_cell) {    /* detected valid byte or start delimiter */
    goto process state;
}
else {
    stay in idle state;
}
process state:
if (byte_count == 1) {    /* start of cell */
    enable header_crc;
}
if (byte_count == 5) {    /* output PAD1 */
    output header crc syndrome;
}
if (byte_count == 6) {
    enable payload_crc;
}
if (end of cell)         /* detected delimiter byte */
    output payload crc syndrome;
    if (byte_count == 53) {  /* cell size correct */
        output no framing error;
    }
    else {
        output framing error;
    }
    goto idle state;
}
```

Figure 10:
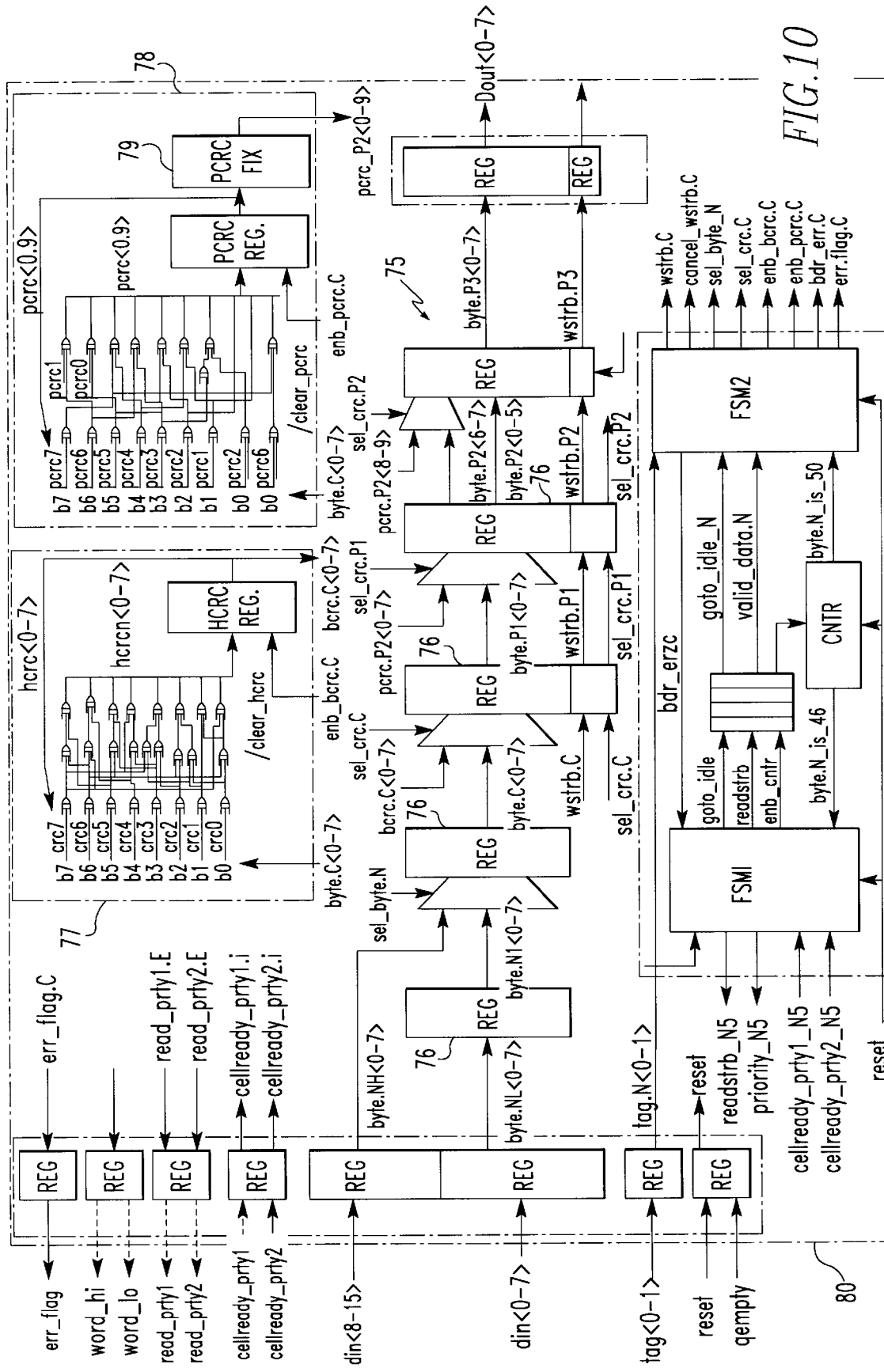
FIG. 10 is a schematic representation of a transmit engine chip.

The cell formatter 28 used for the transmit path is very similar to the receive cell formatter 26, except that the data flows in the reverse direction. FIG. 10 shows a chip design overview of the transmit cell formatter 28.

I/O Interfaces The input section interfaces to a 16-bit wide transmit FIFO. Each 16-bit word read is converted to two bytes and fed into the datapipe 75. The output section interface to an 8-bit wide transmitter (for example, an AMD TAXI chip 73 shown in FIG. 11).

Datapipe There is a datapipe 75 consisting of five eight-bit registers 76 to pipeline the byte stream as CRC checksums are computed in parallel.

Header CRC Unit 77 The same circuitry is used for the header CRC 77 unit as the receive cell formatter 26. In this case, the value obtained as the remainder is shipped out as the CRC checksum—after computing the CRC value for the header over the first four bytes of the cell, the computed CRC value is sent as the fifth byte of the cell if indicated by the control bit in the PAD1 field.

Payload CRC Unit 78 The same circuitry is used for the payload CRC unit 78 as in the receive cell formatter 26, plus an additional stage called the payload CRC fix stage 79. During transmission, the CRC checksum for the payload 54 needs to be computed over the first forty-six bytes of the payload 54 plus the first six bits of the forty-seventh byte. This is because the payload CRC checksum is a ten-bit value appended to the end of the cell payload 54. To compute the payload CRC checksum in a byte-parallel way, the CRC is computed over the first forty-seven bytes of the payload by setting the last two bits of the forty-seventh byte to zeros. This is followed by the fix stage computation where the effect of computing over two extra bits is rolled back. The inputs to the fix stage are cr<0:9> as specified before in the receiver section. The output of the fix stage is fcr<0:9> which is the final payload CRC checksum. The fcr<0:9> is obtained from cr<0:9> using the following equations:

$fcr0 = cr2 \wedge cr1 \wedge cr0$ $fcr1 = cr3$ $fcr2 = cr4 \wedge cr0$ $fcr3 = cr5 \wedge cr1$ $fcr4 = cr6 \wedge cr0 \wedge cr1$ $fcr5 = cr7$ $fcr6 = cr8$ $fcr7 = cr9 \wedge cr0$ $fcr8 = cr1$ $fcr9 = cr0 \wedge cr1$ Control FSM 80 A finite state machine (FSM) is used to control the operation of the cell formatter 28 and generate various internal control signals based on the byte count. The algorithm implemented by the FSM 80 is as follows:

```
if (reset) {
    initialize FSM;
    gota idle state;
}
idle state:
if (start_of_cell) {       /* detected cell ready signal */
    goto process state;
}
process state:
if (byte_count == 1) {     /* start of cell */
    enable header_crc;
}
if (byte_count == 5) {     /* processed header */
    if (HCRC compute) {    /* insert computed header CRC */
        output header crc checksum;
    }
    else {                 /* pass byte 5 unchanged */
        output byte 5 of input
    }
}
if (byte_count == 6) {
    enable payload_crc;
}
if (byte_count == 52)      /* end of payload? */
    if (PCRC compute) {    /* insert computed payload CRC */
        output payload crc checksum;
    }
    else {                 /* pass last 2 bytes unchanged */
        output byte 52 and 53 of input;
    }
    goto idle state;
}
```

Sometimes an ATM cell received by a computer 14 must be discarded because the computer 14 cannot process it due either to the cell being incorrect or previous cells from the same packet having been incorrect. To discard a cell, the computer 14 must read all of the cell's words from the interface 16. This is an unnecessary overhead given that the computer 14 does not want to process the cell at all.

To speed up the discarding of cells, called cell flushing, a special control word is written to the interface 16 which causes the interface 16 to automatically discard the remainder of the cell. Flushing can be initiated at any point during the cell reading, allowing the host computer 14 to read only as much as it strictly needs to before determining whether it should process or discard the cell.

The flushing mechanism is implemented by a simple and fast state machine that can read a word from the receive FIFO every clock cycle. The trailer of each cell is tagged using an extra tag bit in the receive FIFO; most commercial FIFO chips contain an extra ninth bit that can be used for this purpose.

The state machine is triggered by the host computer 14 writing a special control word to the interface 16. Once triggered the state machine reads successive words from the receive FIFO until it encounters the trailer word of the cell. When a word is read, it is not delivered to the host computer 14 over the computer I/O bus 15; it is simply dropped. Since reading words over the computer I/O bus 15 is actually a time-consuming process, the flushing mechanism allows a cell to be discarded much more quickly.

Putting all the above mechanisms together provides computers 14 with a complete set of mechanism for efficiently processing ATM communication. For example, when a computer 14 wants to process an ATM cell that has been received by the interface 16, it will first read a thirty-two bit word to obtain the ATM cell header 52. Based on the information in the cell header 52, the computer will determine which AAL protocol is being used for the cell and, therefore, the format of the cell payload 54.

Assuming that the cell header indicates a cell using the VBR AAL format the following occurs:

1. The computer 14 will read the next thirty-two bit word. The upper two bytes of the returned word will contain the HEC and PAD1 fields (if they are zero the cell header 52 must be correct), and the lower two bytes will contain the SAR header.
2. Thereafter, the computer 14 will read eleven consecutive words and receive the entire user data all word-aligned.
3. Finally, the computer 14 will read the last word. The upper two bytes will contain the SAR trailer and the lower two bytes will contain the PAD2 field. If the cell is correct the PAD2 field will be 0.

If after reading the cell header 52, the computer 14 finds out that the cell uses another adaptation layer protocol, in which case the payload field is all user data, it will use a different read sequence:

After reading the cell header 52 as a word, it will read a half-word to extract the HEC and PAD1 bytes. At this point, the read pointer will be aligned at the head of the payload field.

The computer will then read twelve consecutive thirty-two bit words and receive the entire cell payload all word-aligned.

Finally, it will use a half-word read to obtain the PAD2 field and then check the cell's correctness.

Although neither of the above cases requires the use of a byte read, in other proposed AALs there are cases in which a field in the cell payload contains an odd number of bytes and thus a byte-read would be needed to realign the read.

A comparison of the interface 16 to a "naive" interface—one with no hardware assistance for SAR processing was conducted.

It was assumed that the naive interface presents a thirty-two bit ATM header word followed by twelve thirty-two bit words of payload. The HEC byte can be accessed somewhere else. This naive interface might be the preferred design for SEAL, for example.

All tests were run on a Sun Sparcstation IPX. All interface accesses were simulated by main memory reads and writes.

| hardware | software | time (microseconds) |
|---|---|---|
| Reading cells: | | |
| HEC, alignment, CRC | | 3.0 |
| HEC, CRC | alignment | 3.6 |
| CRC | HEC, alignment | 4.6 |
| HEC | alignment, CRC | 18.0 |
| | HEC, alignment, CRC | 18.8 |
| Writing cells: | | |
| HEC, alignment CRC | | 2.9 |
| HEC, CRC | alignment | 3.8 |
| CRC | HEC, alignment | 4.3 |
| HEC | alignment, CRC | 18.6 |
| | HEC, alignment, CRC | 18.8 |

| Approximate breakdown of time, in microseconds and % of total | | | |
|---|---|---|---|
| 1. | compute HEC | 0.6 | 3% |
| 2. | align payload | 0.7 | 4% |
| 3. | read/write payload | 3.0 | 16% |
| 4. | compute SAR payload CRC | 14.5 | 77% |
| | TOTAL | 18.8 | 100% |

With the interface 16, the only component that remains is the read/write payload time, for a six-fold total improvement over a naive interface.

Note, 1 and 4 are representative of the integrity check and 2 is representative of the re-alignment aspects of the interface 16.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A communication network comprising:
   an ATM network in which an ATM cell of header and a payload travels; and
   at least two general purpose computers, each computer having a processor, a memory in communication with the processor, an input/output bus in communication with the processor, memory and the ATM network, and an interface in communication with the ATM network and the input/output bus, said interface of each computer changing the size of a cell but maintaining the presence of the header and payload of the cell as the cell passes between the ATM network and the processor, said computers communicating with each other through the ATM network by way of the cell and executing instructions for applications other than communications between the other computers.

2. A network as described in claim 1 wherein the interface is comprised of:

a receive engine which receives a cell from the ATM network, determines the cell's integrity, expands the size of the cell by placing a tag with the cell corresponding to the cell's integrity and reorganizes the cell so the cell can be understood by the respective computer, said receive engine in communication with said input/output bus and said ATM network; and a transmit engine which transmits a cell from the respective computer to the ATM network, contracts the size of the cell and reorganizes the cell from the respective computer so the cell from the respective computer can be effectively transmitted on the ATM network, said transmit engine in communication with the input/output bus and the ATM network.

3. A network as described in claim 2 wherein the interface includes a flexible receive queue in which cells from the receive engine are stored in a desired alignment until they are to be provided to the respective computer, said receive queue in communication with the input/output bus and the receive engine; and a flexible transmit queue in which cells from the respective computer are stored in a desired alignment until they are to be provided to the transmit engine, said transmit queue in communication with the input/output bus and the transmit engine.

4. A network as described in claim 3 wherein the receive engine includes a receive cell formatter having means to read CRC's of the cell and place the tag with the cell corresponding to the integrity of the cell as indicated by its CRC's, said receive cell formatter in communication with the ATM network and the flexible receive queue; and the transmit engine includes a transmit cell formatter having means for calculating CRC's for a cell from the respective computer and placing the CRC's in the cell that is to be transmitted to the ATM network, said calculating and placing means in communication with the flexible transmit queue and the ATM network.

5. A network as described in claim 4 wherein the interface includes an input/output bus interface through which cells are provided to and received from the respective computer, said interface input/output bus in communication with the respective computer's input/output bus and with the flexible receive queue and the flexible transmit queue.

6. A network as described in claim 5, wherein the interface includes a reader for presenting a properly aligned cell for the respective computer, or flushing the cell, said reader in communication with the flexible receive queue and the input/output bus interface; and a writer for presenting a properly aligned cell for the ATM network from the respective computer to the flexible transmit queue, said writer in communication with the flexible transmit queue and the input/output bus interface.

7. A network as described in claim 6 wherein the interface includes a network receiver in communication with the ATM network and the receive cell formatter through which cells from the ATM network pass to the receive cell formatter, and a network transmitter in communication with the ATM network and the transmit cell formatter through which cells pass from the transmit cell formatter onto the ATM network.

8. A network as described in claim 7 wherein the receive cell formatter includes an input and an output in communication with the network receiver and the flexible receive queue, respectively, in order to receive cells from the ATM network and transfer cells to the receive queue, respectively.

9. A network as described in claim 8 wherein the receive cell formatter includes a datapipe which delays bytes of a cell received through the input so a header CRC can be computed before the cell is outputted through the output.

10. A network as described in claim 9 wherein the receive cell formatter includes a header CRC check unit which computes a CRC syndrome of a cell header using a predetermined polynomial.

11. A network as described in claim 10 wherein the receive cell formatter includes a payload CRC check unit which computes a CRC syndrome of a cell payload using a predetermined polynomial.

12. A network as described in claim 11 wherein the receive cell formatter includes a counter which counts bytes forming a cell for use in computing the header and payload syndromes and reorganization of the cell.

13. A network as described in claim 12 wherein the receive cell formatter includes a control finite state machine which controls the operation of the receive cell formatter.

14. An ATM apparatus for providing a modified ATM cell to a receiving processor comprising:

a header portion;

a payload portion in conjunction with said header portion; and a tag portion in conjunction with said payload and header portions, said tag portion has information concerning the integrity of the cell, said tag, header and payload portions formed of at least 52+4x bytes, where x is a positive integer $\leq 1$, said tag, header and payload portions are arranged such that they are in alignment for the receiving processor;

a memory mechanism in which the modified ATM cell is stored; and a receive engine adapted to provide the modified ATM cell to the receiving processor.

15. A cell as described in claim 14 wherein said tag portion has information concerning the integrity of the cell, said tag, header and payload portions formed of at least 56 bytes.

16. A cell as described in claim 15 wherein the tag, header and payload portions are arranged such that they are in alignment for a receiving processor.

17. A cell as described in claim 14 wherein the header portion has 5 bytes, the payload portion has 48 bytes and the tag portion has 3 bytes.

18. A cell as described in claim 17 organized such that the 5 bytes of the header portion are in consecutive order, 1 byte of the tag portion is disposed after the header portion, the 48 bytes of the payload portion are in consecutive order after the 1 byte of the tag portion, and bytes 2 and 3 of the tag portion are disposed in consecutive order after the 48 bytes of the payload portion.

19. A cell as described in claim 18 wherein the 1 byte of the tag portion contains CRC syndrome information about the header portion, and bytes 2 and 3 of the tag portion contain framing information about the cell and CRC syndrome information about the payload portion.

20. A system for communication comprising:

an ATM layer in which an ATM comprised of a header and a payload in a first organization and first size travel;

an adaptation layer in communication with the ATM layer in which the ATM cell comprised of payload is converted from the first organization and first size into the ATM cell comprised of the header and payload in a second organization and second size, said first organization and first size different from said second organization and second size; and a user layer in communication with the adaptation layer with the adaptation layer between the user layer and the ATM layer, said ATM cell in the second organization and second size travels in said user layer.

21. A method for communication over an ATM network comprising the steps of:

introducing an ATM cell comprised of a header and a payload in a first organization and a first size onto the ATM network;

receiving the ATM cell at a location having an interface in communication with the ATM network which has a computer;

placing on the ATM cell a tag having a value corresponding to the ATM cell's integrity and converting the header and payload of ATM cell in the first organization and the first size to a second organization and second size different from the first organization and first size;

reading the tag; and providing the ATM cell to the computer if the value of the tag is a predetermined value.

22. A method for communicating as described in claim 28 wherein the reading step includes the step of flushing the ATM cell if the value of the cell is not the predetermined value.

23. A method as described in claim 22 wherein the placing step includes the steps of computing the CRC header syndrome of the cell and determining a first portion of the tag corresponding to the CRC header syndrome, said value comprised of the first portion.

24. A method as described in claim 23 wherein the placing step includes the steps of calculating the payload syndrome of the cell, identifying any framing error of the cell and determining a second portion of the tag corresponding to the CRC payload syndrome and any framing error of the cell, said value comprised of the second portion.

25. A method as described in claim 24 including after the placing step, the step of aligning the tag, header and payload of the cell with respect to the computer.

26. An interface for an ATM network and a computer in order for the computer to efficiently communicate over the network comprising:

a receive engine which receives a cell from the ATM network, determines the cell's integrity, places a tag with the cell corresponding to the cell's integrity and reorganizes the cell so the cell can be understood by the respective computer, said receive engine in communication with the computer and the ATM network; and a transmit engine which transmits a cell from the computer to the ATM network and reorganizes the cell from the computer so the cell from the computer can be effectively transmitted on the ATM network, said transmit engine in communication with the computer and the ATM network.

27. A receive cell formatter comprising:

means for reading CRC's of an ATM cell comprising a header and payload from an ATM network, and means for placing a tag with the ATM cell to increase the size of the cell while maintaining the presence of the header and payload of the cell, said tag corresponding to the integrity of the ATM cell as indicated by its CRC's, said placing means in communication with said reading means.

28. A method as described in claim 21 wherein the placing step includes the step of placing on the ATM cell a tag having a value corresponding to the ATM cell's integrity to expand the size of the ATM cell.

29. A method for communication over an ATM network comprising the steps of:

introducing an ATM cell comprised of a header and a payload in a first organization and first size onto the ATM network;

receiving the ATM cell comprised of the header and the payload in the first organization and first size at a location in communication with the ATM network which has a computer;

changing the size and organization of the ATM cell comprised of the header and the payload in the first organization and first size to a second size and a second organization different from said first organization and first size; and providing the ATM cell comprised of the header and the payload in the second organization and second size to the computer.

30. A method as described in claim 29 wherein the changing step includes the step of expanding the size of the ATM cell comprised of the header and the payload.

31. A method as described in claim 30 wherein the expanding the size includes the step of adding at least a first, a second and a third byte to the ATM cell comprised of the header and the payload.

32. A method as described in claim 31 wherein the adding step includes the steps of inserting the first byte between the header portion and the payload portion, and adding the second and third bytes to the ATM cell after the payload portion such that the payload portion is between the first byte and the second and third bytes.

33. A method as described in claim 32 wherein the first byte contains CRC syndrome information about the header portion, and the second and third bytes contain framing information about the ATM cell and CRC syndrome information about the payload portion.

* * * * *